Jan. 19, 1971  O. R. NEMETH ET AL  3,556,908
APPARATUS FOR SPLICING FILM
Filed Sept. 7, 1966  11 Sheets-Sheet 1

INVENTORS
Otto R. Nemeth
Friedrich Torch
BY
Ernest F. Marreague
Attorney

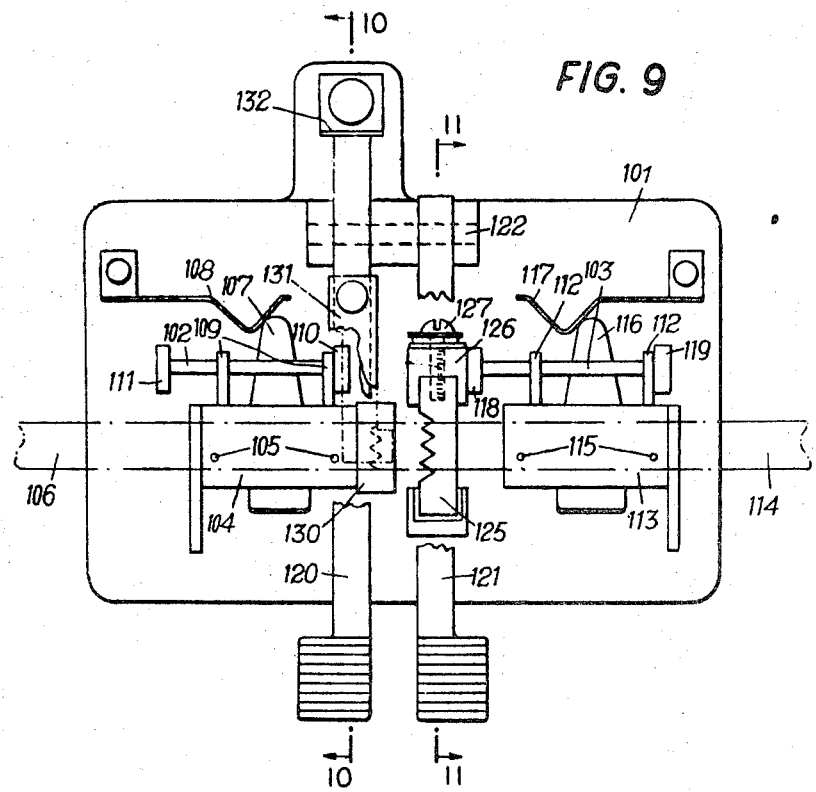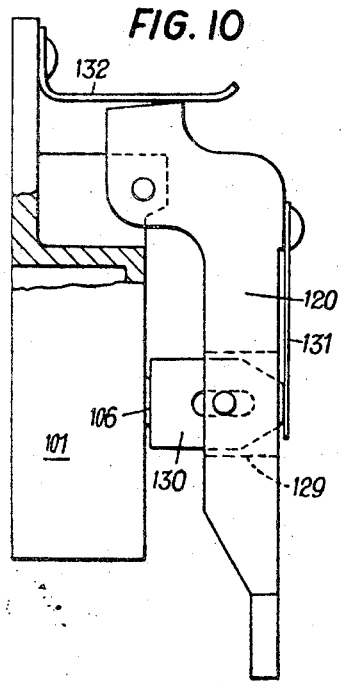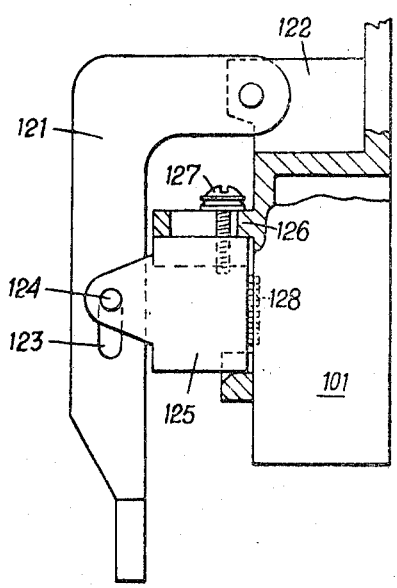

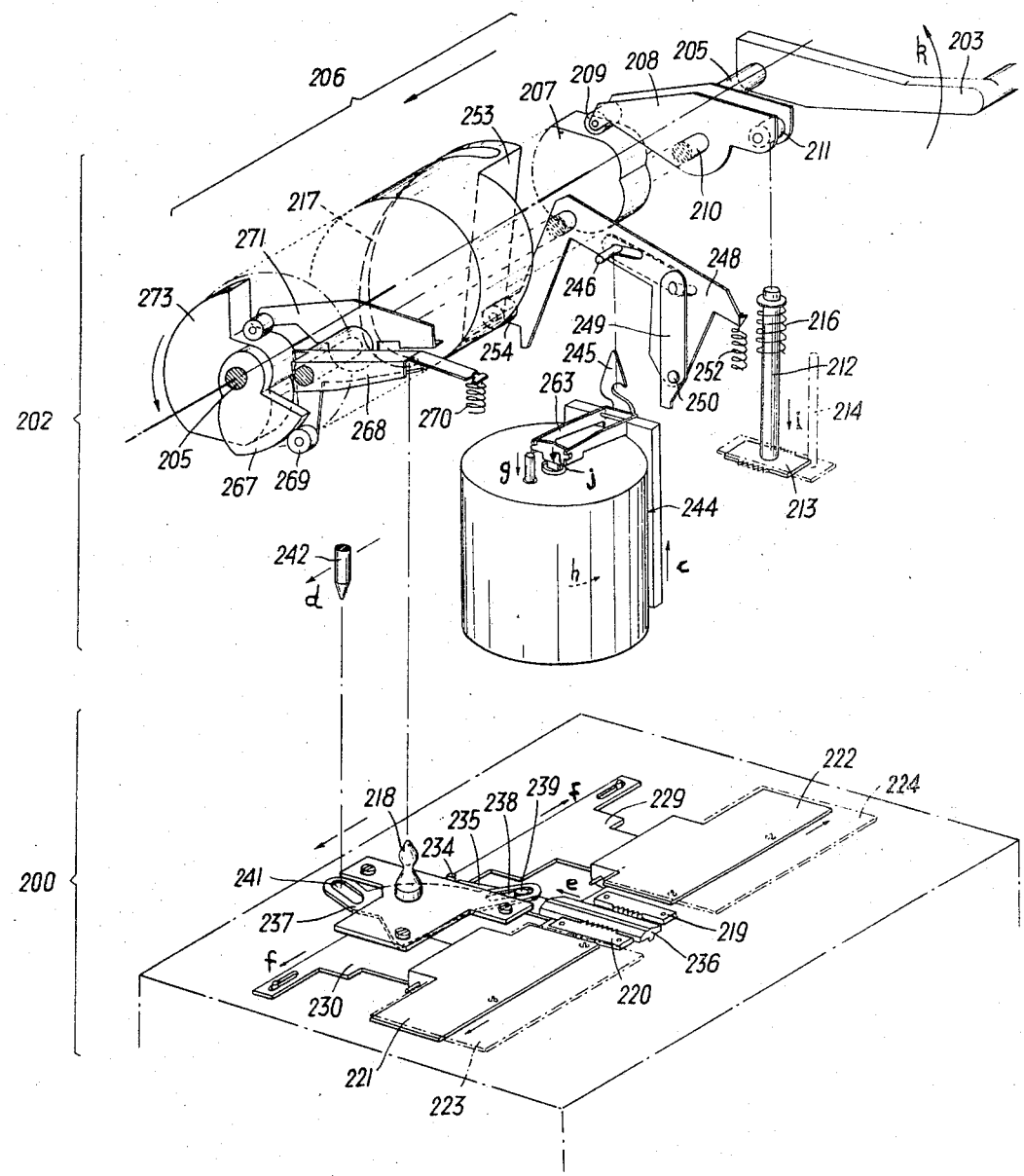

United States Patent Office 3,556,908
Patented Jan. 19, 1971

3,556,908
APPARATUS FOR SPLICING FILM
Otto R. Nemeth, Los Angeles, Calif., and Friedrich Forch, Vienna, Austria, assignors to Karl Vockenhuber and Raimund Hauser, both of Vienna, Austria
Filed Sept. 7, 1966, Ser. No. 577,705
Claims priority, application Austria, Oct. 21, 1965, A 9,564/65
Int. Cl. G03d 15/04
U.S. Cl. 156—508
27 Claims

ABSTRACT OF THE DISCLOSURE

A film splicing apparatus which comprises in combination means which define a cutting edge for cutting one end of two film ends to be spliced together in a path alternately extending inwardly and outwardly a plurality of times, in order to increase the butt area of said one film end over the area resulting from a straight angle transverse cut by a factor greater than 2. Means are also provided for positioning the two film ends in opposing co-planar relationship, and further means for urging the two film ends together in mating relationship, whereby adhesive material inserted between the opposed ends before pressing the same together will cover a greater area and thus provide a greater holding force after the splice has been completed, as compared to the holding force provided for straight transverse cuts. The means for positioning the two film ends and the means for urging the two film ends together comprises film guide platens. Sprocket teeth are carried by each of the film guide platens. Means are also provided for displacing at least one of the guide platens from the cutting position into the splicing position comprising a spring. The guide platens for the film ends are pressed to immovable, but adjustable abutments. Upper and longer pressure platens retain the film ends during the splicing. The lower pressure platen is displaceably disposed crosswise to the longitudinal direction of the film ends and is outside of the longitudinal axis of the film during the cutting, but is below the film ends in its working position for the splicing operation adjusting means for the control of the longitudinal movement of the guide platens for the film ends and for the cross-movement of the lower pressure platen.

---

The present invention relates to a method of and apparatus for splicing film, tape, or equivalent material.

Film or tape is conventionally spliced by cutting the two film ends to be connected together in straight transverse directions generally at right angles to the longitudinal axis of the film. A small length of film emulsion is then scraped from one of the ends and the other end then positioned to overlap the one end. Suitable adhesive is applied to the scraped or cleaned end and the overlapped portions pressed together and held in position until the adhesive has set.

Another system for splicing film constitutes cutting straight or curved transverse edges on the two ends to be secured together and abutting the same with the film held in coplanar relationship. A suitable splicing material such as a small portion of tape or the like is then caused to overlap both abutting ends to secure the same together.

In both of the foregoing film splicing operations, there results an increased thickness of the film at the point of splice. As a consequence, the film is somewhat less flexible because of the double layer involved. Therefore, when the film is caused to execute relatively short turns of small radius of curvature, such as when formed into the conventional loops between a projector pull-down structure and sprocket wheel, it exhibits a discontinuity rather than a smooth curve. This discontinuous portion may weaken the splice and oftentimes will result in breaking of the film immediately adjacent the overlapping portions.

A double thickness of film at a splice point may be avoided by forming a butt splice. However, when attempting to butt the straight transverse edges of two film ends to be spliced together, there is provided very little cross-sectional area for the adhesive or other holding material to gain a proper hold on the film. Therefore, such direct butt splices have usually been unsuccessful.

With the foregoing in mind, it is a primary object of the present invention to provide a greatly improved apparatus for splicing film or tape in which the foregoing disadvantages are overcome.

More particularly, it is an object to provide an improved apparatus for splicing film in which double or greater thicknesses are avoided at the point of splice, to the end, that when a film is caused to execute short radii of curvature turns, there is not any appreciable discontinuity in the film itself, so that no weak points can thus develop, which might result in breaking of the film.

Briefly, these and other objects and advantages of the invention are attained by cutting or otherwise forming the two film ends to be spliced together, in a manner to deviate from the conventional straight transverse end edge, so that a greatly increased effective cross-sectional holding area is provided. By this arrangement, the two ends may be pressed together in abutting relationship and yet a sufficiently large holding area is available to insure a strong splice.

An apparatus for carrying out the foregoing operation, which is described in the copending application Ser. No. 539,238, filed Feb. 14, 1966, now Pat. No. 3,282,759, comprises suitable means for forming a cut in the ends of the film which may take the form of an in and out path such as a sawtooth. Suitable means are then provided for positioning the two ends of the film in opposing relationship and biasing or otherwise urging the same together. In addition, a feature of the apparatus resides in the provision of upper and lower platens for confining adhesive or other material placed between the opposing ends, so that there is assurance that the entire exposed butt end areas are wetted with the adhesive and take part in securing the ends together. Moreover, the upper and lower platen of the apparatus prevents the overall thickness of the film from being increased any appreciable extent by the adhesive itself.

An apparatus for splicing film suitable for performing the new method of splicing has the following characteristics:

(a) Devices for cutting the ends of the film pieces to be connected together in accordance with the profile which deviates from a cutting line extending from the longitudinal axis of the film ends straight at a right angle, so that the butting face of the film ends is increased relative to a butting face created with a straight cut.

(b) Means for clamping the ends of the film pieces in a joint plane.

(c) Means for guiding together and pressing together the ends of the film pieces, so that the profiled butting faces interengage, whereby the adhesive inserted into the butting joints can be applied to a greater face and thereby brings about a stronger connection of the film pieces, as it would be possible in connection with a straight line butting joint.

It is one embodiment of the present invention to provide an apparatus for splicing, a joint cutting tool as well as a pair of pressure plates for those film ends, which preferably are set off relative to each other in longitudinal direction of the film, whereby two film guides are displaceable independently from each other in longitudinal direction of the film.

It is another embodiment of the present invention to provide an apparatus which comprises preferably two parallel pairs of film guides disposed symmetrically to a lever, whereby within the range of a first pair of coaxial film guides a cutting tool jointly for both film ends with a tooth-like curved cutting edge, is arranged and within the range of the second pair of coaxial film guides pressure plates are disposed. The die of the cutting tool and a preferably resilient pressure plate are disposed on the lever, which is swingable about an axis parallel to the film guide and under circumstances, is under the effect of a snapping spring in its working position, in which the pressure plate disposed on the lever is pressed towards the second immovable pressure plate.

A particular advantage of the new splicing apparatus resides in the fact that such individual working operation is mechanized to a great extent, whereby the handling of the splicing apparatus is further simplified. For this purpose, the apparatus contains in a still further embodiment of the present invention an adhesive container, as well as devices for application of the adhesive to at least one of the two film ends.

With these and other objects in view, which will become apparent in the following detailed description, the present invention will be clearly understood in connection with the accompanying drawings, in which.

Figure 1:
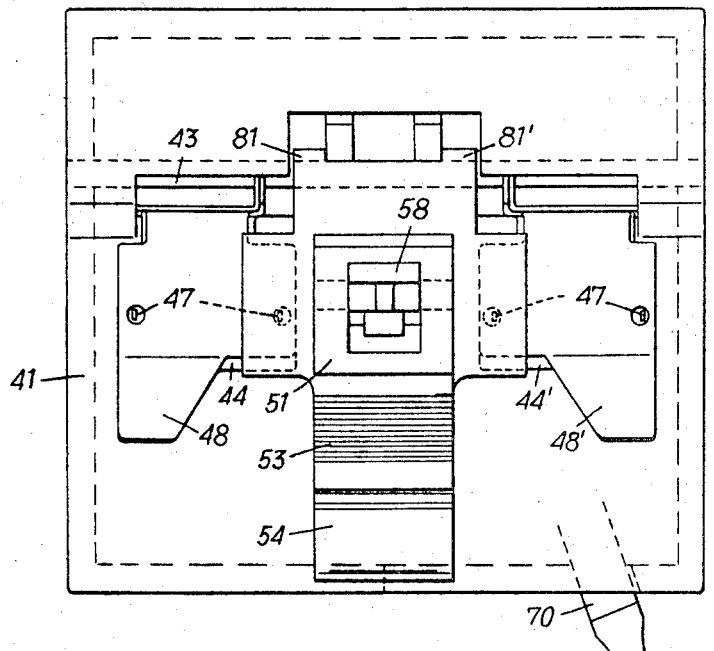
FIG. 1 is a top plan view of the apparatus designed in accordance with the present invention.
Figure 3:
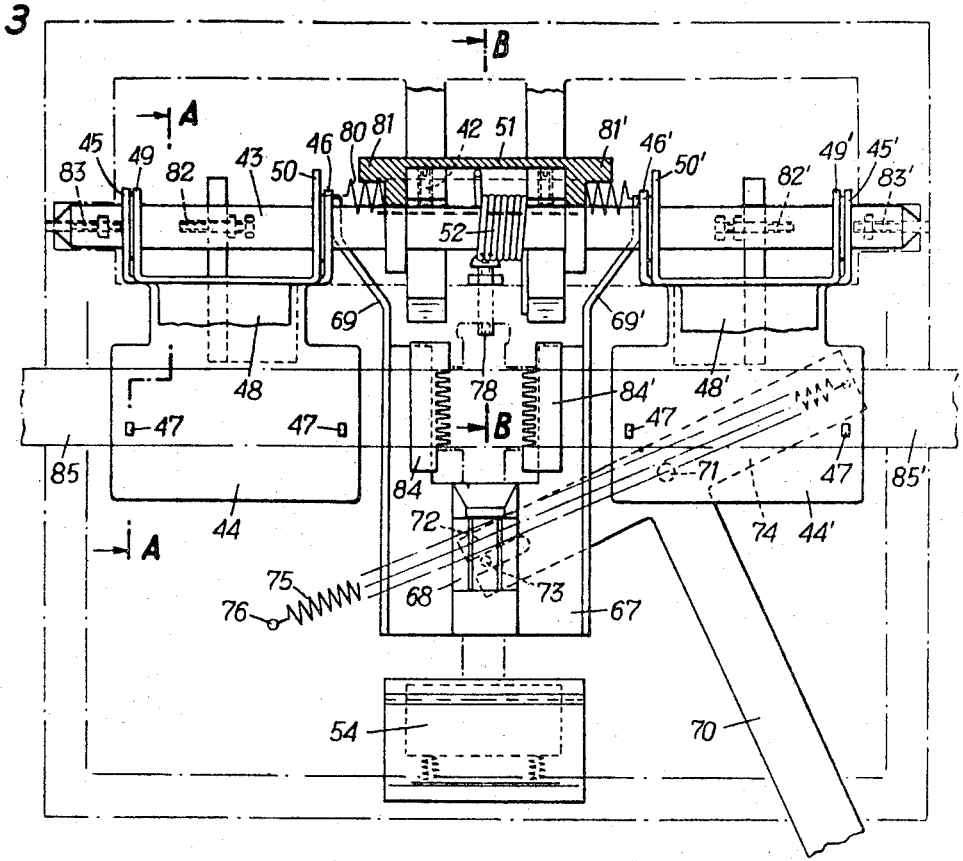
Figure 4:
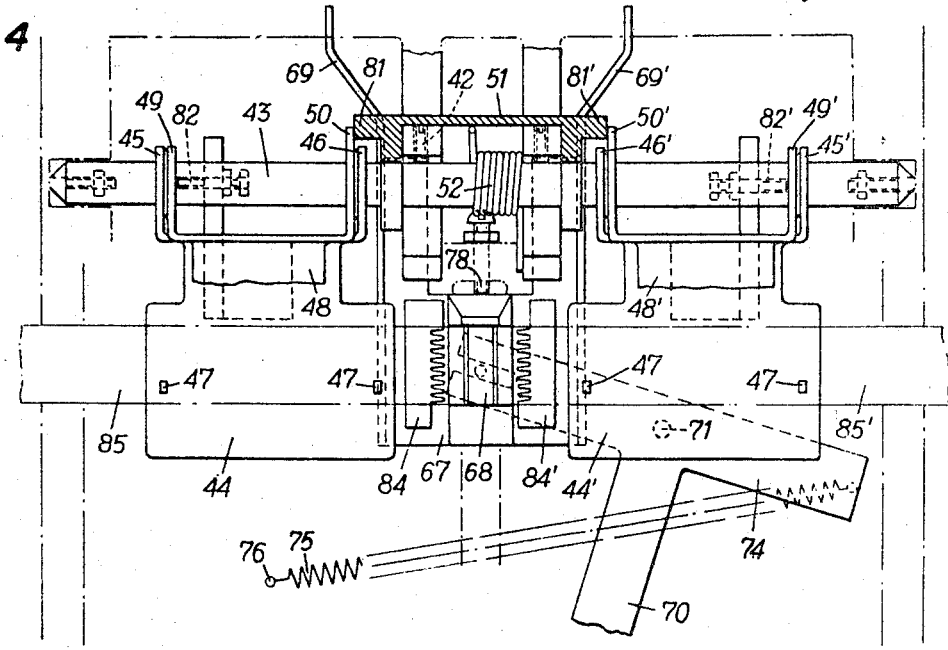
Figure 5:
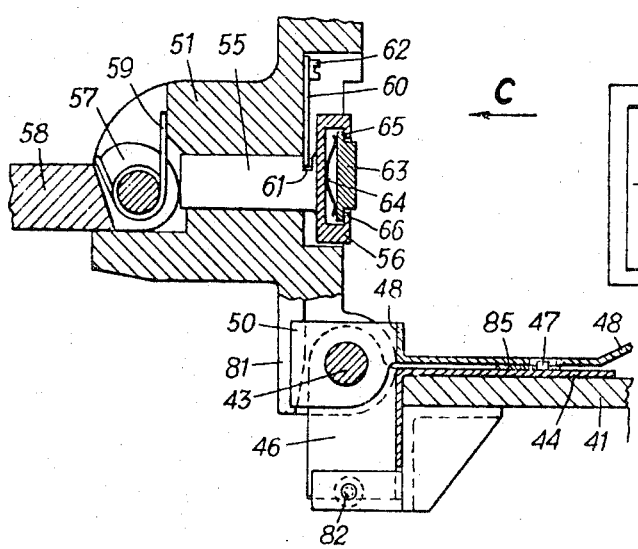
Figure 6:
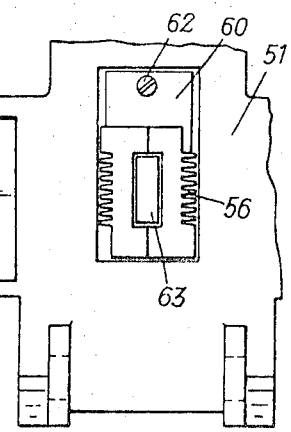
Figure 7:
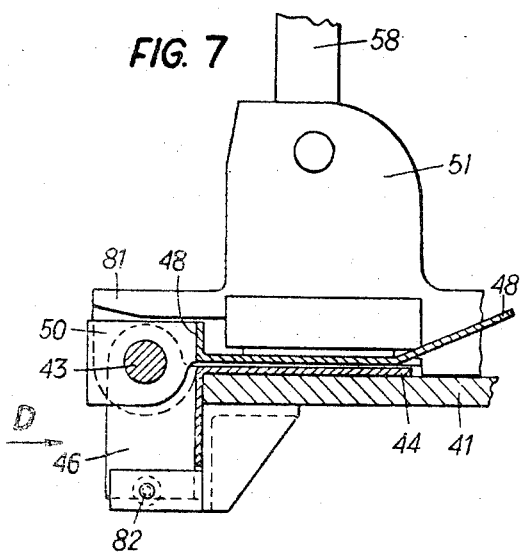
Figure 8:
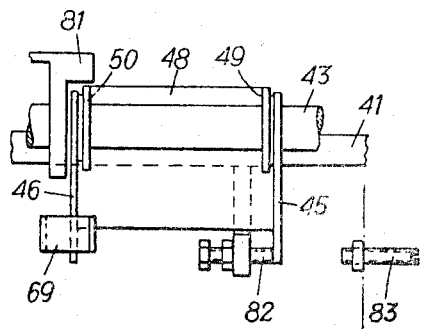
Figure 13:
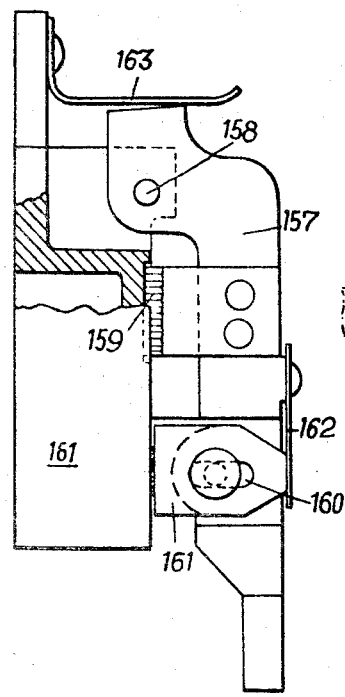
Figure 12:
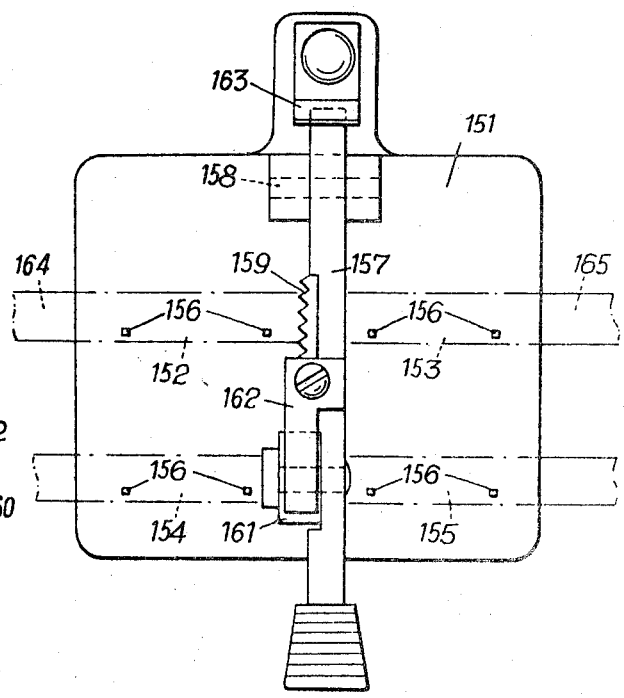
Figure 14:
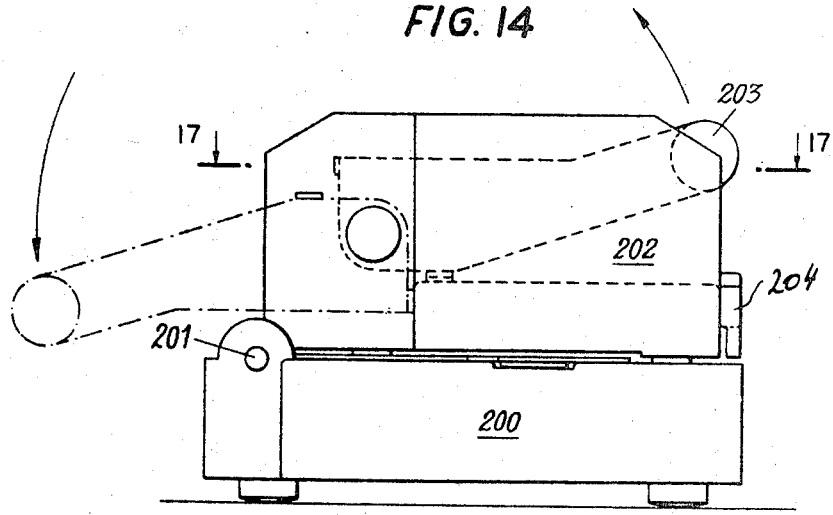
Figure 15:
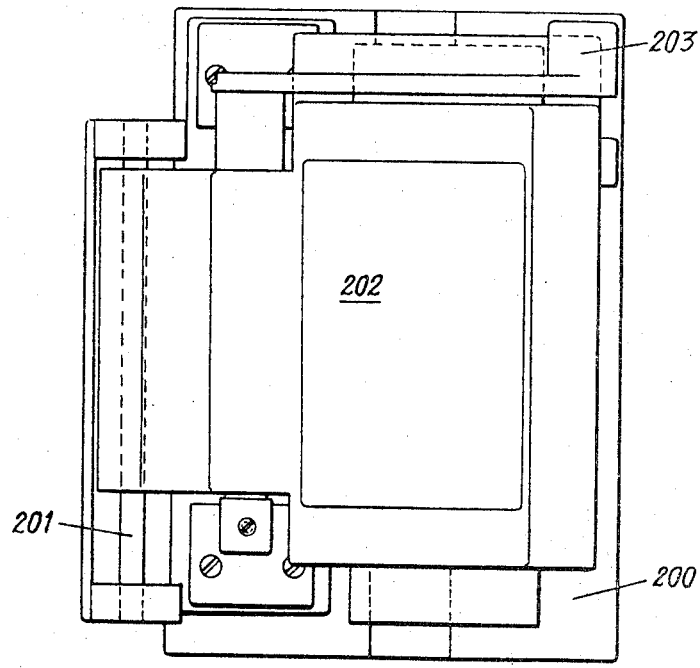
Figure 16:
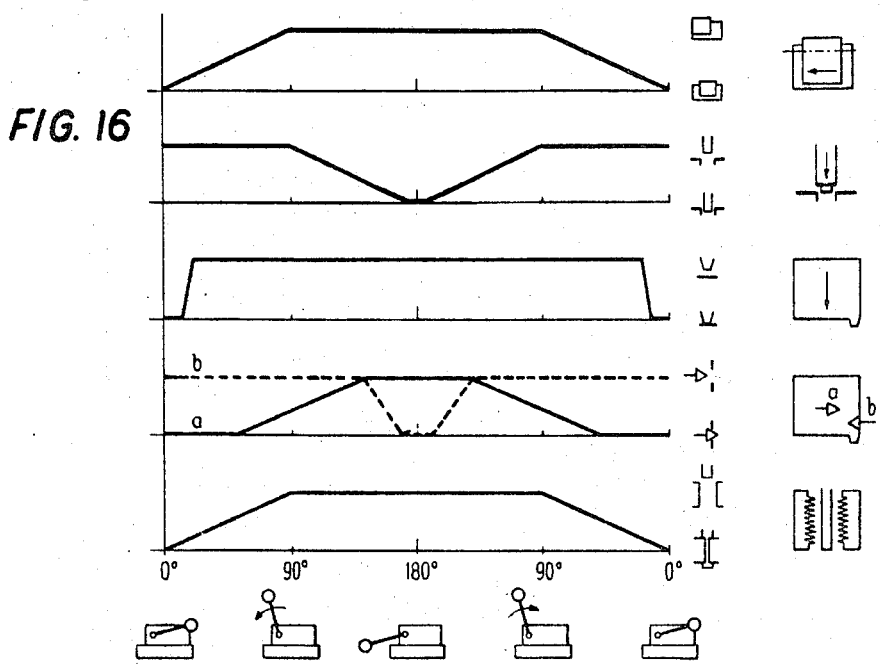
Figure 17:
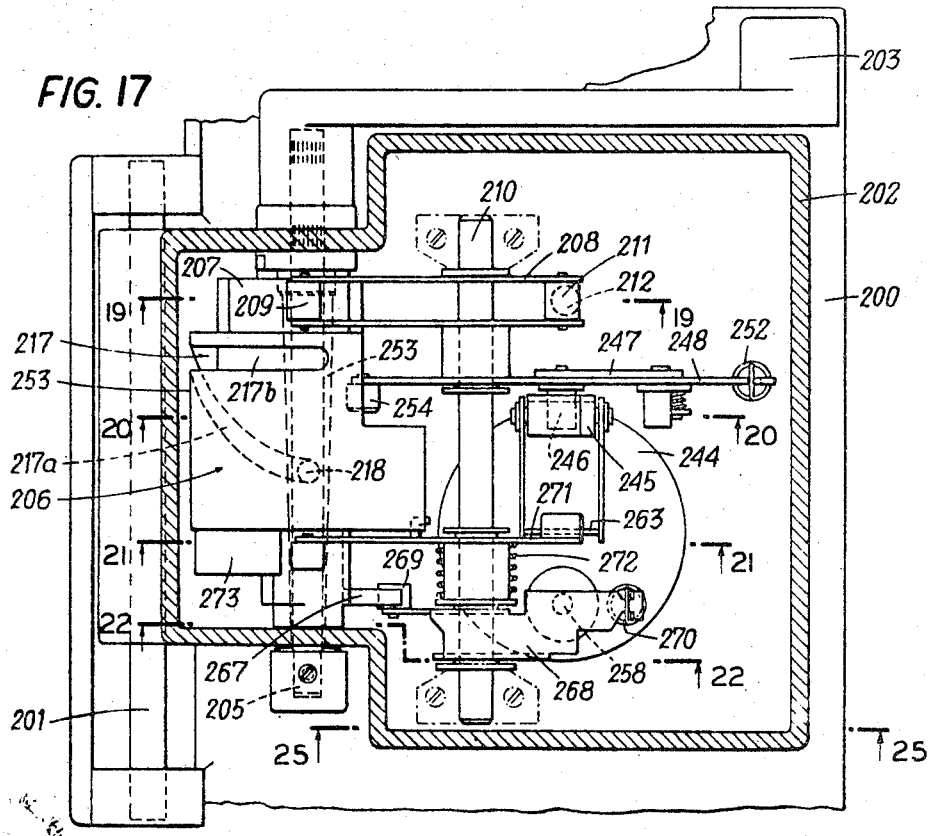
Figure 18:
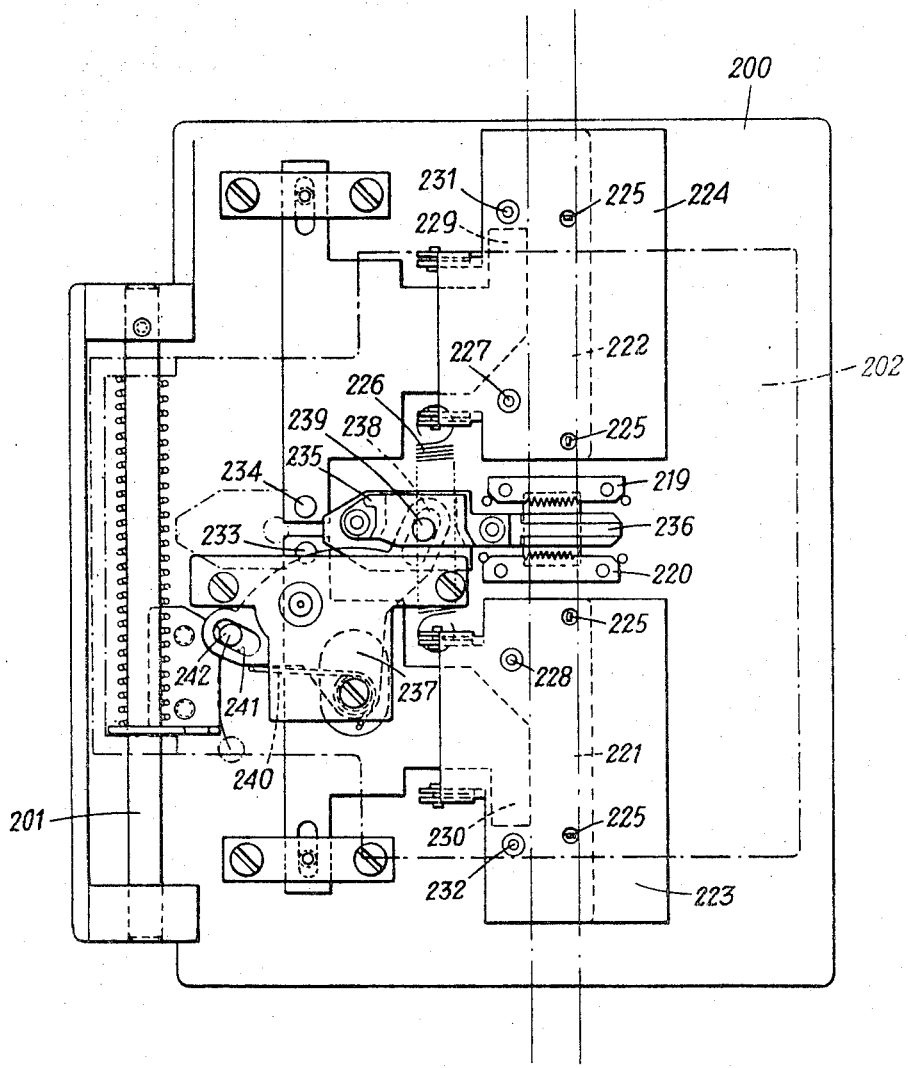

FIG. 3 discloses at a larger scale a top plan view of the apparatus for splicing disclosed in FIG. 1, the housing being indicated in point dotted lines and in which the apparatus is ready for cutting of the film ends;

FIG. 4 is a top plan view similar to that shown in FIG. 3, in which, however, the apparatus for splicing is prepared for the actual adhesive process;

FIG. 5 is a section in accordance with the planes A—A and B—B of FIG. 3;

FIG. 6 is an elevation of the apparatus disclosed in FIG. 5 seen in the direction C of FIG. 5;

FIG. 7 is a section similar to that of FIG. 5 of the splicing apparatus in a splicing position;

FIG. 8 is a fragmentary elevation seen in the direction D of FIG. 7;

FIG. 9 is a top plan view of the splicing apparatus designed in accordance with the present invention;

FIG. 10 is a section along the plane 10—10 of FIG. 9;

FIG. 11 is a section along the plane 11—11 of FIG. 9;

FIGS. 12 and 13 are front and side elevations, respectively, of a splicing apparatus constituting a fourth embodiment of the present invention;

FIG. 13a is a perspective view of an other embodiment of a splicing apparatus of the present invention, with the most important parts shown in exploded view;

FIG. 14 is a side elevation of the embodiment of the splicing apparatus of FIG. 13a;

FIG. 15 is a top plan view of the splicing apparatus disclosed in FIG. 14;

FIG. 16 discloses diagrammatically by a movement diagram the functions of the different elements of the splicing apparatus;

FIG. 17 is a section along the lines 17—17 of FIG. 14;

FIG. 18 is a top plan view of the base body of the splicing apparatus;

FIGS. 19, 20, 21 and 22, as well as 25, are sections along the lines 19—19, 20—20, 21—21, 22—22 and 25—25 of FIG. 17;

FIG. 23 is a fragmentary elevation of the splicing apparatus; and

FIG. 24 is a section along the plane 24—24 of FIG. 23.

While several embodiments of the present invention have been set forth and described, the entire apparatus of the present invention is not to be thought of as limited to such embodiments. Thus, while "film" has been illustrated, this term is herein defined to include tape or equivalent material. Also, it will be appreciated that a sawtooth configuration, although preferred, is only exemplary of the type of splice embodied in the present invention. It is desirable, however, that all mating portions of the abutting film ends be angled with respective longitudinal axes of the film, in order to obtain maximum squeezing of the adhesive therebetween and, thereby, avoid the concave type weld. Instead of a sawtooth cut it is also possible to provide a dovetail or meander-shaped cut. It is also to be understood that the longitudinal length of the teeth or equivalent tapered members be such, as to create sufficient resisting leverage to the tendency towards discontinuity as the result of film movement about paths of small radius. Furthermore, as heretofore mentioned, it is necessary that the total area of service or abutting area be sufficient to at least equal in strength the none-spliced film.

Referring now to the drawings, and in particular to FIGS. 1 to 8, the substantially desk-shaped housing 41 of the splicing apparatus is disclosed, in which housing a shaft 43 is secured by means of screws 42. Film guide platens 44 and 44' are displaceably mounted on this shaft 43 by means of projections 45, 46, and 45', 46', respectively. The platens 44 and 44' carry pins 47, which penetrate into perforation holes of the film. The film is retained by film guide plates 48 and 48', which are angularly set off, similar to the platens 44 and 44', and are mounted displaceably and swingably with extensions 49, 50, and 49', 50' for longitudinal and swingable displacement on the shaft 43. Furthermore, a bearing block 51 is swingably mounted on the shaft 43, which bearing block is turned by means of a spring 52 into the position shown in point-dotted lines in FIG. 2. The bearing block 51 can be turned by means of a grip 53 into the position shown in full lines in FIG. 2, in which position it is secured by means of a resting device 54 which is spring-biased and which is displaceable cross-wise to the shaft 43.

A die 55 is displaceably guided in the bearing block 51, which block 51 carries on its side pointing towards the film a cutting blade 56 having substantially zig-zag-shaped cutting edges. The die 55 is displaced by a cam 57, which is turned by means of a lever 58 against the force of a spring 59. The die 55 is retained by a blade spring 60, which enters a recess 61 of the die 55 and is secured by means of a screw bolt 62 to the bearing block 51. A pressure platen 63 is arranged in the center of the cutting blade 56, which pressure platen 63 is pressed against corresponding shoulders 66 of the cutting blade 56 by means of extensions 65 through a spring 64.

Furthermore, a slide 67 is provided in the housing of the splicing apparatus, which slide 67 is displaceable cross-wise to the shaft 43. The slide 67 carries a pressure platen 68, as well as control means such as, two elastic runners 69 and 69', which cooperate at control faces with the extensions 46 and 46' of the film guiding plate 44, and which press the latter by means of the extensions 45 and 45' against immovable set screws 83 and 83', respectively. The slide 67 is adjustable by means of a T-shaped lever 70 which is mounted about a pivot 71 in the housing of the splicing apparatus and with its fork-shaped end 72 surrounds a pin 73 of the slide 67. A spring 75 is provided on the lever arm 74 disposed opposite the fork-shaped end thereof, which spring 75 is secured with its other end to a point 76 of the housing of the splicing apparatus. The spring 75 is arranged such, that the slide 67 is retained by a spring force in its end positions. If starting from the position shown in FIG. 3 of the drawings, the grip 77 (FIG. 2) of the lever 70 is turned towards the left, the slide 67 is displaced towards the shaft 43, whereby at first a dead point has to be overcome and the spring 75 displaces the slide 67 into its adhesive applying position defined by the abutment 78.

Figure 2:
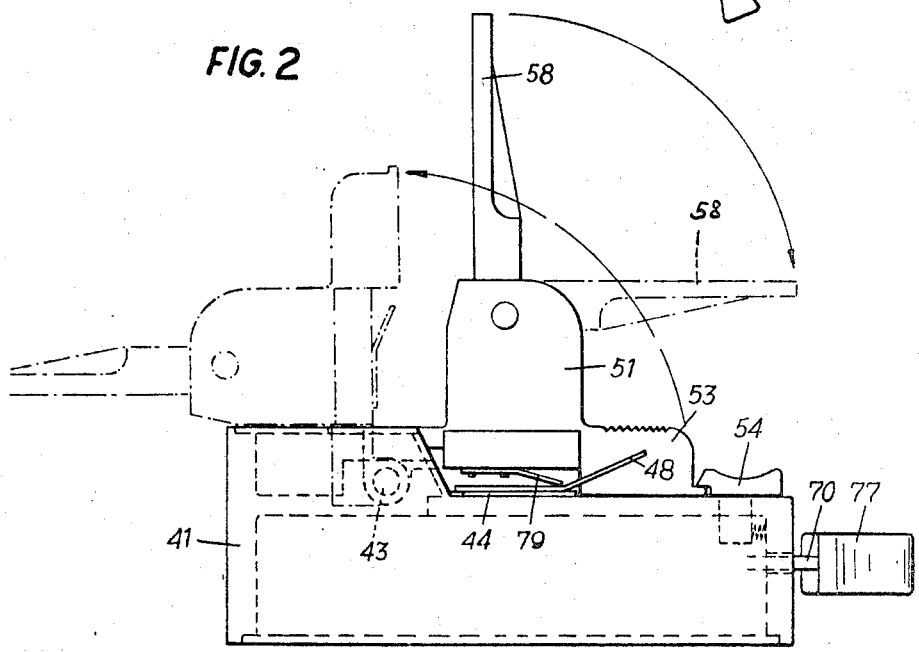
FIG. 2 is a side elevation of the apparatus in which the bearing block cutting the cutting die is disclosed in two different positions.

The operation and function of the splicing apparatus designed in accordance with the present invention is substantially as follows:

Starting from the position disclosed in FIGS. 1 and 2, at first, by displacement of the key 54, the bearing block 51 is turned upwardly. The cover plates 48 and 48' are likewise turned upwardly and the film ends 85 and 85', to be spliced, are fixed with their perforation holes on the pins 47 of the film guiding plates 44 and 44'. The bearing block 51 is then again turned downwardly, whereby the springs 79 join in this movement the cover plates 48 and 48'. The bearing block 51 engages with its grips 53 on the key 54. By turning the lever 58, the cutting die is, thereafter, moved downwardly and the film ends are cut saw tooth like. The bearing block 51 is then returned by operation of the key 54. By turning the grip 77 of the lever 70 towards the left, on the one hand, the pressure platen 68 is displaced towards the shaft 43 and, on the other hand, the elastic runners 69 and 69' release the extensions 46 and 46' of the film guiding plates 44 and 44', which latter are displaced relative towards each other under the effect of the spring 80 into a position, in which the extensions 50 and 50' of the cover plates 48 and 48' support themselves on projections 81 and 81' of the bearing block 51. By the displacement of the film guides 44 and 44', the two ends of the film 85 and 85' have been approaching each other to a distance of about ½–1 mm. and are now disposed directly above the film pressure platen 68. Now, the adhesive is applied and the bearing block 51 is again turned downwardly. Immediately prior to achieving the closing position, the inclined projections 81 and 81' (FIG. 7) release the extensions 50 and 50' of the cover plates 48 and 48', whereby due to the spring 80, the two film guiding plates 44 and 44' are dispatched relative to each other, until the extensions 45 and 45' of the film guiding plates 44 and 44' engage fixed but adjustable abutments 82 and 82'.

In the splicing position, the sawtooth-like cut film ends abut each other directly and are pressed against the lower pressure plate 68 secured to the slide 67 by the upper pressure plate 63 resiliently mounted in the cutting die 56. By this arrangement, an escape of the adhesive is prevented and a thickening of the spliced point is avoided. In this position of the bearing block 51, the projections 81 and 81' overlap the extensions 50 and 50' of the cover plates 48 and 48', so that, upon operation of the key 54, the bearing block 51 joins also the two cover plates 48 and 48' during its upward movement and, thus, releases thereby the spliced film. The exact position of the film guide plates 44 and 44' in the cutting position of the splicing apparatus is defined by the set screws 83 and 83', while, in the spliced position, the abutments 82 and 82' determine the exact position of the mentioned film guide plates 44 and 44' (FIG. 8). In the spliced position, the distance of the pins 47 of the film guide plates 44 from the pins 47' of the film guide plates 44' is a full number multiple of the perforation step of the film.

The present invention is not limited to the embodiment disclosed and described above. Thus, for instance, the pressure plate 63 provided on the cutting blade 56 can be secured rigidly to the latter, while the pressure plate 68 is formed resiliently and remains continuously between the two cutting tools 84 and 84'.

Referring now again to the drawings, and in particular to FIGS. 9 to 11, the base plate 101 of another embodiment of the splicing apparatus is disclosed, which base plate 101 carries two coaxially disposed shafts 102 and 103. A film platen 104 is displaceably mounted on the shaft 102, which film platen 104 is equipped with pins 105, which engage the perforation holes of the film 106 indicated in point-dotted lines and which fix the film 106 to the film guide plate 104. A cam 107 is secured to the film guide plate 104, which cam 107 cooperates with a substantially immovable blade spring 108 of substantially triangular configuration. By the cooperation of the cam 107 and the spring 108, it is assured, that the film guide engages at first with its arms 109 the immovable abutment 110 and, in addition, engages the immovable abutment 111 and in both positions assumes an exactly defined position. In analogous manner, a film guide platen 113 is mounted on the shaft 103 by means of arms 112, which film guide platen 113 has pins 115 engaging the perforation holes of the film end 114 for securing the latter. The film guide platen 113 carries likewise a cam 116, which cooperates with a spring 117 and assures that the film guide 113 supports itself, at first, on an immovable abutment 118 and, on the other hand, on the immovable abutment 119. On the ground plate 101 are, furthermore, swingably mounted two levers 120 and 121 about a shaft 122. The lever 121 (FIG. 11) has a longitudinal slot 123, in which a pin 124 of a slide 125 engages, which slide 125 is retained in a guide 126 by means of a screw 127 and is guided parallel to itself. The slide 125 carries on its underside a cutting die 128, which cooperates with a cutting tool provided in the ground plate 101. The lever 120 has a guide 129, in which a pressure member 130 is displaceably guided and is biased by a blade spring 131. The lever 120 is under the effect of a blade spring 132, which urges the lever 120 against the pressure plate 101 and thereby presses the pressure member 130 against an immovable pressure plate.

The operation and function of the embodiment disclosed in FIGS. 9 to 11 is substantially as follows:

Starting from the position shown in FIG. 9, at first the two levers 120 and 121 are turned upwardly. Thereafter, a film strip 106 is inserted into the film guide 104, whereby the film strip 106 is oriented and fixed by pins entering the perforation holes of the film strip 106. By pressing the lever 121, the cutting die 128 is moved downwardly and the film end is cut meander-shaped and zig-zag-shaped, by example, respectively. The lever 121 is then again moved upwardly and the guide 104 is displaced together with the film strip 106 towards the left, whereby the spring 108 engaging the cam 107 presses against the left arm 109 of the film guide 104 towards the immovable abutment 111. A film strip 114 is now inserted in the film guide 113, which film strip 114 is oriented and fixed by means of pins 115 engaging the perforation holes of the film strip 114. By pressing the lever 121, the film end is likewise cut meander-shaped or zig-zag-shaped, respectively. The lever 121 is then again lifted upwardly. The two film ends which are now released are wetted with adhesive, and the film guide 113 is moved towards the left. The spring 117 causes jointly with the cam 116, that the film guide 113 supports itself with the arm 112 on the immovable abutment 118. The abutments 111 and 118 are adjusted such, that the distance of the pin 105 in the film guiding plate 104 from the pins 115 and the film guiding plate 113 amount to a full numbered multiple of the perforation step. Now, the lever 120 is turned downwardly and presses under the effect of the springs 132 and 131 the die 130 against the two film ends. Upon setting of the adhesive, the lever 120 is turned backwards into its original position and the spliced film is removed from the guides 104 and 113. Upon displacement of the guide 104 and 113 into their right original position, the splicing apparatus is ready for the next splicing operation.

Referring now again to the drawings, and in particular to FIGS. 12 and 13, a further embodiment of the present invention is disclosed, in which the base plate 151 of the splicing apparatus is shown, on which base plate 151 guides 152, 153, 154 and 155 for films are provided. Each of these guides has a pair of pins 156, which enter perforation holes of the film strip and which orient and fix the film in the guide. On the base plate is provided a lever 157 which is swingably mounted about a shaft 158, which, in turn, is arranged parallel to the film guides. Within the range of the film guides 152 and 153 is secured on the lever 157 a cutting die 159, which cooperates with a cutting tool immovably secured on the base plate or the ground plate 151. Within the range of the film guides 154 and 155, the lever 157 is equipped with a pressure member 161 guided in a longitudinal slot 160 provided in the lever 157, which pressure member 161 is disposed under the effect of a flat spring 162. The lever 157 is urged by means of a spring 163 against the ground plate 151.

The operation and function of the last mentioned embodiment of the splicing apparatus is as follows:

At first, a film strip 164 is inserted into the film guide 152 and the ends thereof are cut by pressing down the lever 157 to obtain a meander-shaped or zig-zag-shaped cut. The film strip 164 is then removed from the film guide 152 and is inserted into the film guide 154. The second film strip 165 is inserted in analogous manner into the film 153, cut and, upon application of an adhesive at the butt faces of the two film strips 164 and 165, inserted into the guide 155. The abutting point of the two film strips is fixed by downward turning of the lever 157 between the movable pressure die 161 and the immovable pressure plate. Upon setting of the adhesive, the film can be removed from the splicing apparatus.

The present invention is, again, not limited to the shown and described embodiment. Thus, for instance, the lever 157 can be mounted between the film guides 152, 153, and 154, 155 and can have the pressure die on one side and the cutting die on the other side.

Referring now again to the drawings, and in particular to FIGS. 14 to 25, another embodiment of the splicing apparatus is disclosed, in which the individual working operations are automatized to a great extent. FIGS. 15 and 16 disclose a splicing apparatus, which has a ground body 200 on which a slide 202 is mounted for longitudinal displacement and for turning on a shaft 201. The operation of the splicing apparatus takes place by means of a crank 203 mounted on the slide 202, which crank 203 is shown in FIG. 14 in dotted lines in its inoperative position and in point-dotted lines in its operative position. In the position shown in FIGS. 14 and 15, the slide 202 is locked to the ground body 200. This locking can be released upon pressing of a key 204. A cam member 206 is secured to a shaft 205 of the crank 203, which cam member 206 has individual cam discs for control of the cutting die and for the application of adhesive (FIG. 23). The cam member 206 has a first cam disc 206 (FIG. 17).

Figure 19:
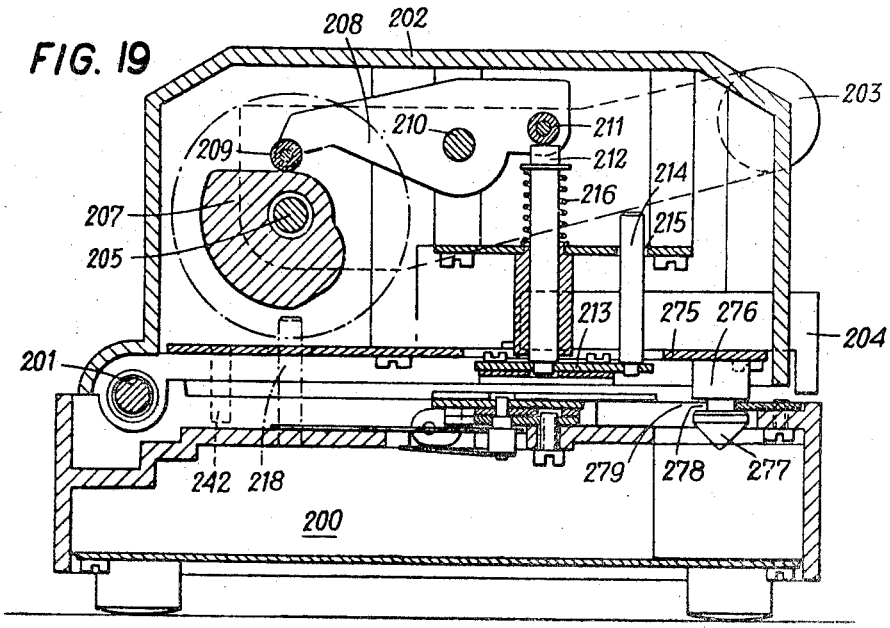

The cam member 206 has a first cam disc 207, on which is supported a two-armed lever 208 having a pressure roll 209 (FIG. 19). The lever 208 is mounted on a shaft 210 which is secured in the slide 202. The second arm of the lever 208 engages with a roll 211 a stamp 212, which is vertically guided in the slide housing and which carries at its lower end a cutting plate 213. A pin 214 is riveted to the latter, which pin 214 is guided in a bore 215 of the slide and, thereby, prevents the rotation of the cutting die 213. The cam disc 207 is arranged such, that upon rotation of the crank 203 in counter-clockwise direction for an angle of about 90°, no adjustment of the lever 208 takes place. Upon further rotation (up to 180°) the cam disc 207 turns the lever 208 in clockwise direction and displaces, thereby, the stamp 212 and the cutting die 213 in downward direction. Upon return of the crank 203 to its original position a spring 216 displaces the stamp 212 upwardly, whereby the latter and the lever 208 return to their original positions.

The cam member 206 has furthermore a groove 217, which within a first range (from 0° to 90°) 217a is designed screw-like and in a second range (from 90° to 180°) 217b is limited by plane faces (FIG. 17). A bolt 218 secured to the ground body 200 of the splicing apparatus engages the groove 217 (FIG. 19). This arrangement causes that, upon rotation of the shaft 205 about 90°, the cam member 206 and, thereby, the entire slide are displaced along the shaft 201. Upon further rotation (from 90° to 180°), the pin 218 is disposed in the range 217b of the groove 217, so that a slide 202 remains immovable relative to the ground body 200 in this range of rotation of the shaft 205.

By the longitudinal displacement of the slide, it is brought about that the cutting die 213 is transmitted from its inoperative position to its operative position, in which the two cutting plates 219 and 220 are disposed opposite each other, which are secured to the ground body 200 of the splicing apparatus (FIG. 18). Holding devices for the two film ends are provided on the ground body 200, which holding devices have platens 221 and 222, to which cover plates 223 and 224 are pivoted. The plates 221 and 222 have each two pins 225, which engage in known manner the perforation holes of the film and secure the latter in exactly defined positions. The two pairs of platens 221, 223 and 222, 224 are displaceable parallel to the shaft 201. A pull spring 226 urges the two pairs of plates towards each other. In the position shown in FIG. 18, the two pairs of platens support themselves by bolts 227 and 228 on abutment faces (not shown) of the ground body 200. Upon cutting the film ends, the two pairs of platens assume relative to the showing in FIG. 18, a greater relative distance. The longitudinal displacement of the mentioned pairs of platens takes place by means of platens 229 and 230, which support themselves in the cutting position on bolts 231 and 232 of platens 221, 222 and move the latter outwardly. The platens 229 and 230 carry bolts 233 and 234. The control of the two platens takes place by means of plate 235, which is substantially of trapezoid shape and displaces in the position shown in dotted lines the two bolts 233 and 234 and, thereby, the platens 229 and 230 to their outer end positions.

The plate 235 carries a tongue-like projection 236 ("anvil") which is disposed in the position shown in FIG. 18 between the two cutting dies 219 and 220 and supports the splicing point of the film during the actual splicing process. The plate 235 is displaceably guided by means (not shown) perpendicularly to the shaft 201, and is controlled by an angular lever 237. The latter receives with a longitudinal slot 238 a pin 239 secured to the plate 235 and is retained by means of a spring 240 in the position shown in FIG. 18. The angular lever 237 has a second longitudinal slot 241, in which a bolt 242 secured to the slide 202 engages (FIG. 19). It is assured, thereby, that upon transmitting the slide into its cutting position, the "anvil" 236 is withdrawn and also the holding devices for both film ends assume their cutting positions.

Figure 20:
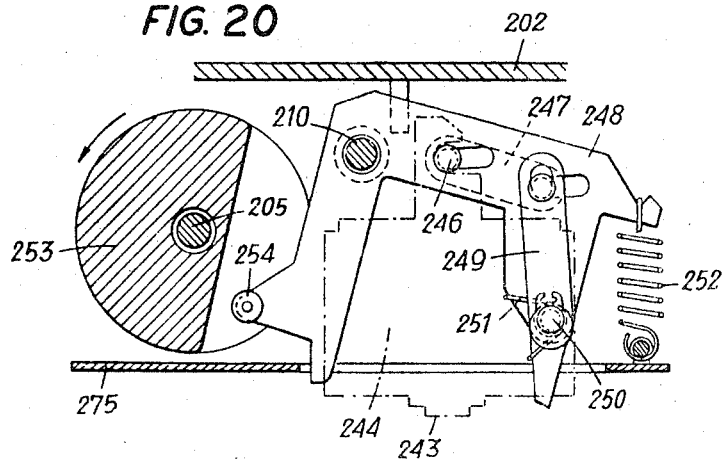

In the inoperative position of the slicing apparatus, a mouth piece 243 of an adhesive receiving container 244 is pressed upon the "anvil" 236 and the film ends to be spliced, respectively. The adhesive receiving container 244 has a hook, which surrounds the bolt 246 of a platen 247 (FIGS. 17 and 20). The platen 247 is mounted for longitudinal displacement on a two-armed lever 238. A lever 249 engages the platen 247, which lever 249 is mounted on the lever 248 at 250. A spring 251 tends to turn the lever 249 in counter-clockwise direction and, thereby, to displace the platen 247 towards the left. The lever 248 stands, on the one hand, under the effect of the spring 252, and, on the other hand, is turned by means of the cam disc 253 of the cam member 226. The cam disc 253 is designed such, that it abuts already upon a small rotating angle upon the roll 254 of the lever 248 and turns the latter in counter-clockwise direction. This brings about, that the container 244 for the adhesive is lifted from the film and from the "anvil" 236, respectively, against the effect of the spring 252. Upon turned-up slide 202 by pressing the free lever arm of the lever 249, the bolt 246 is displaced towards the right and, thereby, the container 244 for the adhesive is unlocked. It is then possible to remove the container 244 for the adhesive, for instance for refilling with adhesive.

FIG. 24 discloses the structure of the container 244 for the adhesive as well as the dosing device for the adhesive. On the cover 255 of the container 244 for the adhesive is mounted an angular lever 256, which carries, on the one hand, a valve plate 257 and, on the other hand, is controlled by means of a stamp 258. The mentioned stamp 258 is under the effect of a spring 259, and is equipped with a valve cone 260, which is pressed onto a corresponding valve seat 261. Upon pushing the stamp 258 the valve 260, 261 is opened, while simultaneously the valve plate 257 closes an obliquely disposed channel 262 in the wall of the container 244 of the adhesive. A second angular lever 263 is swingably mounted on the container 244 for the adhesive, which angular lever 263 carries a valve cone 264 on one lever arm, which valve cone 264 closes from the outside the channel 262.

The valve cone 264 is pressed into a corresponding valve seat 266 by means of a spring 265.

Figure 21:
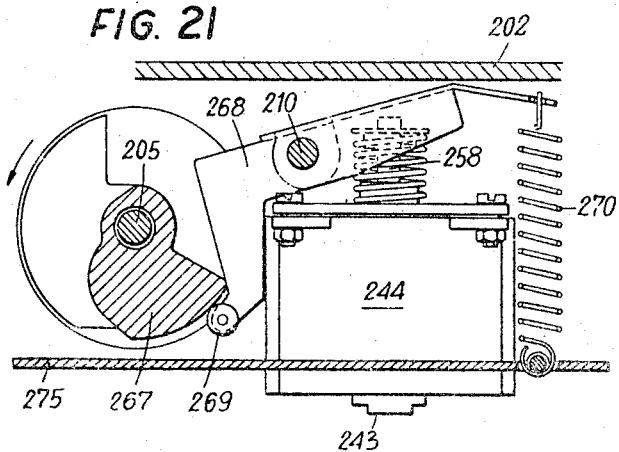

The operation of the container 244 of the adhesive upon dosing of the adhesive is substantially as follows:

At first, by pressing down the stamp 258, the valve 260, 261 is opened and, thereby, a pressure balance between atmospheric pressure and that of the container 244 is obtained. Simultaneously, the channel 262 is closed from the inside by the valve plate 257. If now the angular lever 263 is turned counter-clockwise, the valve cone 264 opens the channel 262, and the volume of liquid adhesive contained in the channel 262 flows into the mouth piece 243. Upon release of the lever 263 and of the stamp 258, the valves assume again the position shown in FIG. 24 and the channel 262 is filled again with the adhesive. The control of the movement of the stamp 258 takes place by means of a cam disc 267 provided on the shaft 205 (FIG. 21). On the mentioned cam disc 267, a cranked and spring-biased two-armed lever 268 having a roll 269 supports itself.

Figure 22:
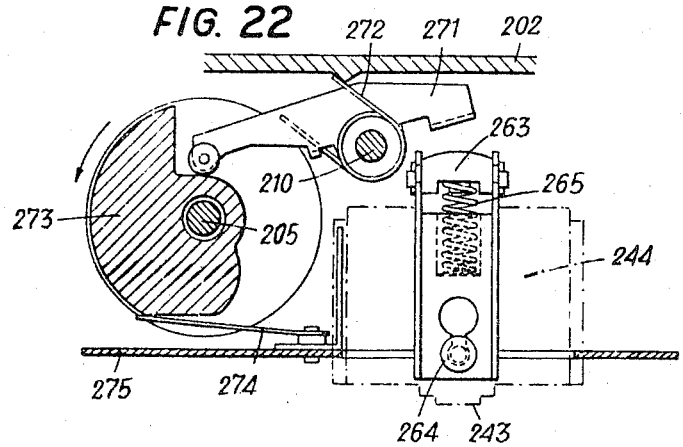

The cam disc 267 has, for an angle of about 50 degrees, a constant radius. Upon further rotation of the shaft 205, the roll 269 reaches cam parts having a smaller radius. The lever 268 is, thus, turned in clockwise direction under the effect of a spring 270 and abuts, thereby, the stamp 258, whereupon the bleeding valve 260, 261 is opened and the plate valve 257 closes the channel 262. The valve 264, 266 of the container 244 of the adhesive is controlled by a lever 271, which supports itself under the effect of a spring 272 on the cam disc 273 of the cam member 206. FIG. 22 discloses a blade spring 274 which engages the cam disc 273 and secures the shaft 205 and, thereby, also the crank 203 in their inoperative positions.

FIG. 19 discloses the locking device for the slide 202. The locking device comprises a platen 275 mounted for displacement perpendicularly to the shaft 201, which platen 275 carries a bolt 276, which has a conical point 277 and a narrow portion 278 disposed behind the point 277. The platen 275 is moved towards the right by means of a spring (not shown). In the position shown in FIG. 19, the bolt 276 is received in a longitudinal slot 279 arranged parallel to the shaft 201. Upon operating the key 204, the locking can be released and the slide can be turned counter-clockwise. By this movement, two hooks 280 and 281, displaceably mounted in the slide 202 perpendicularly to the shaft 201, join the two cover plates 223 and 224 of the film holding device and open the latter. Due to the different pivotal points of the hooks 280 and 281, on the one hand, and of the cover plates 223 and 224, on the other hand, the two members are disconnected in the position of the cover plates indicated by dotted lines in FIG. 25.

The operation of the just described embodiment of the splicing apparatus will now be explained in connection with FIG. 13a and the movement diagram disclosed in FIG. 16.

At first, the slide 202 is turned upwardly as indicated by arrow a, whereupon the two film ends are inserted into the holding device 221–224. The slide is, again, turned downwardly and the crank 203 is turned for 180° as indicated by arrow k. By this arrangement, at first the container 244 of the adhesive is lifted, as indicated by arrow c by means of the cam disc 253 and lever 248 and the slide 202 is displaced in longitudinal direction as indicated by arrow d by the groove 217 and the pin 218 (FIG. 17). Simultaneously the "anvil" 236 is withdrawn as indicated by arrow e by the lever 237 and the two holding devices for the film are displaced as indicated by arrow f into their cutting position by the trapezoid shaped plate 235 together with bolts 233, 234 (FIG. 18). After passing a rotary angle of about 50°, the opening movement as indicated by the arrow g of the bleeding valve 260, 261 of the container 244 of the adhesive starts under control of the cam disc 267 (also note FIG. 21). Simultaneously the channel 262 is closed as indicated by arrow h by the valve plate 257 (FIG. 24). After a rotary angle of about 90°, the slide, the "anvil" and the film holding device have reached the cutting position. Upon further rotation of the crank 203, the cutting die 213 is pressed downwardly as indicated by arrow i driven by cam disc 207 and lever 208 and cuts on the immovable cutting plates 219 and 220 the two film ends with a saw tooth-like end formation. After a rotary angle of about 140° the plate valve 257 is closed, whereupon the outer valve 264, 266 opens as indicated by arrow j controlled by cam disc 273 and lever 271 (as also shown in FIG. 22) and the adhesive flows into the mouthpiece 243. If the crank 203 is returned into its original position, the valve 264 and 266 closes again. Simultaneously, the cutting die 230 is withdrawn upwardly. At 140° the opening of the plate valve 257 starts, while simultaneously the bleeding valve 260, 261 closes. At a turning angle of 90°, the cutting die reaches again its inoperative position. Upon further rotation of the crank 203 the slide 202 moves again into this starting position, whereby the two holding devices for the film are displaced relative to each other and the cutting positions of the film ends are pressed towards each other. Simultaneously, the "anvil" 236 has moved below the cutting point of the film ends. In the last phase of the rotation of the crank 203, finally the mouthpiece 243 of the container 244 for the adhesive is set upon the cutting position of the film ends, whereby the adhesive penetrates into the butt by capillary effect. The two film ends are pressed between the mouthpiece and the "anvil" 236 up to the setting of the adhesive. After a drying time of about one minute the key 204 is operated and the slide 202 is lifted. The two hooks 280 and 281 join thereby the cover plates of the film holding device, so that the spliced film can be removed directly from the splicing apparatus.

The present invention is not limited to the shown and described embodiments. It is thus possible by corresponding displacement of the holding plates for the two film ends, to avoid a displacement of the slide. In this case the cutting tools are disposed opposite to each other in all positions, while by means of an immovable "anvil" a mouthpiece 243 of the container for the adhesive is provided. The two film holding devices are displaced in such embodiment in the same direction, however, for different lengths. Instead of the dosing device shown in the drawings, it is, of course, possible to use also other devices for dosing of small liquid volumes. The drive and control, respectively, of the cutting tools and of the dosing—and application—devices can be performed instead by means of cams, also by means of crank drives or other equivalent means. Finally, in addition to a manual drive, also a motor drive of the splicing apparatus i spossible.

While we have disclosed several embodiments of the present invention, it is to be understood that these embodiments are given by example only and not in a limiting sense.

We claim:

1. A film splicing apparatus comprising in combination means defining a cutting edge for cutting one end of two film ends to be spliced together in a path alternately extending inwardly an doutwardly a plurality of times, in order to increase the butt area of said one film end over the area resulting from a straight angle transverse cut by a factor greater than 2, means for positioning said two film ends in opposing coplanar relationship, means for urging said two film ends together in mating relationship, whereby adhesive material inserted between the opposed ends before pressing the same together will cover a greater area and thus provide a greater holding force after the splice has been completed, as compared to the holding force provided for straight transverse cuts, said means for positioning said two film ends and said means for urging said two film ends together comprises film guide platens, sprocket teeth carried by each of said film guide platens, means for displacing at least one of said guide platens from the cutting position into the splicing position comprising a spring, said guide platens for said film ends are pressed to immovable, but adjustable abutments, upper and longer pressure platens retaining said film ends during the splicing, said lower pressure platen is displaceably disposed crosswise to the longitudinal direction of said film ends and is outside of the longitudinal axis of said film during the cutting, but is below said film ends in its working position for the splicing operation, and adjusting means for the control of the longitudinal movement of said guide platens for said film ends and for the cross-movement of said lower pressure platen.

2. The apparatus, as set forth in claim 5, wherein said means for cutting comprises a common cutting tool for both film ends, said pressure platens disposed set off relative to each other in longitudinal direction of said film, and two film guide platens being displaceable independently from each other in longitudinal direction of said film.

3. The apparatus, as set forth in claim 2, which includes a guide guiding said cutting tool parallel to itself, and a lever operating said cutting tool.

4. The apparatus, as set forth in claim 3, wherein one of said pressure platens is a movable pressure member, and a spring urging said pressure member toward said film.

5. A film splicing apparatus comprising in combination means defining a cutting edge for cutting one end of two film ends to be spliced together in a path alternately extending inwardly and outwardly a plurality of times, in order to increase the butt area of said one film end over the area resulting from a straight angle transverse cut by a factor greater than 2, means for positioning said two film ends in opposing co-planar relationship, means for urging said two film ends together in mating relationship, whereby adhesive material inserted between the opposed ends before pressing the same together will cover a greater area and thus provide a greater holding force after the splice has been completed, as compared to the holding force provided for straight transverse cuts, said means for positioning said two film ends and said means for urging said two film ends together comprises film guide platens, sprocket teeth carried by each of said film guide platens, two pressure platens retaining said film ends during the splicing, said pressure platens preventing escape of adhesive material, means for adjusting said guide platens for said film ends in two steps, whereby said film ends are brought into a small relative distance in the first part of the adjusting movement, a further displacement of said guide platens being performed by the closing movement of said pressure platens, whereby said film ends are brought into relative engagement, one of said pressure platens is swingable about an axis disposed parallel to the longitudinal axis of said film, said one of said pressure platens has first abutments supporting said guide platens for said film ends upon lifting said one of said pressure platens, thereby causing a small distance between said two cut film ends, said abutments of said one of said pressure platens, upon closing the latter, releasing said guide platens, immovable, but adjustable second abutments defining the splicing position, and a spring urging said guide platens into the splicing position.

6. The apparatus, as set forth in claim 5, wherein said guide platens comprise a platen each carrying said sprocket teeth adapted to be received in the perforation holes of said film ends, cover plates swingable about an axis disposed parallel to the longitudinal axis of said film, each of said cover plates has a projection, and an abutment cooperating with said projection in the splicing position of said one of said pressure platens and joining the opening movement of said one of said pressure platens and causing the lifting of said swingable cover plates.

7. The apparatus, as set forth in claim 5, wherein said one of said pressure platens is swingable into splicing position against the force of a spring, and means for retaining said one of said pressure platens in the splicing position.

8. A film splicing apparaus comprising in combination means defining a cutting edge for cutting one end of two film ends to be spliced together in a path alternately extending inwardly and outwardly a plurality of times, in order to increase the butt area of said one film end over the area resulting from a straight angle transverse cut by a factor greater than 2, means for positioning said two film ends in opposing co-planar relationship, means for urging said two film ends together in mating relationship, whereby adhesive material inserted between the opposed ends before pressing the same together will cover a greater area and thus provide a greater holding force after the splice has been completed, as compared to the holding force provided for straight transverse cuts, said means for positioning said two film ends and said means for urging said two film ends together comprises film guide platens, sprocket teeth carried by each of said film guide platens, two pressure platens retaining said film ends during the splicing, said pressure platens preventing escape of adhesive material, means for adjusting said guide platens for said film ends in two steps, whereby said film ends are brought into a small relative distance in the first part of the adjusting movement, a further displacement of said guide platens being performed by the closing movement of said pressure platens, whereby said film ends are brought into relative engagement, a bearing block swingable about an axis disposed parallel to the longitudinal axis of said film, a cutting die mounted in said bearing block and operatively connected with said one of said pressure platens, and a spring means supporting said bearing block in said cover plates of said guide platens, so that said film ends are clamped therebetween.

9. A film splicing apparatus comprising in combination means defining a cutting edge for cutting one end of two film ends to be spliced together in a path alternately extending inwardly and outwardly a plurality of times, in order to increase the butt area of said one film end over the area resulting from a straight angle transverse cut by a factor greater than 2, means for positioning said two film ends in opposing co-planar relationship, means for urging said two film ends together in mating relationship, whereby adhesive material inserted between the opposed ends before pressing the same together will cover a greater area and thus provide a greater holding force after the splice has been completed, as compared to the holding force provided for straight transverse cuts, said means for positioning said two film ends and said means for urging said two film ends together comprises film guide platens, sprocket teeth carried by each of said film guide platens, two pressure platens retaining said film ends during the splicing, said pressure platens preventing escape of adhesive material, means for adjusting said guide platens for said film ends in two steps, whereby said film ends are brought into a small relative distance in the first part of the adjusting movement, a further displacement of said guide platens being performed by the closing movement of said pressure platens, whereby said film ends are brought into relative engagement, a bearing block swingable about an axis disposed parallel to the longitudinal axis of said film.

a cutting die mounted in said bearing block and operatively connected with said one of said pressure platens, said cutting die is guided in said bearing block for displacement and safe against rotation, a cam member controlling spring-biased the movement of said cutting die, a lever turning said cam member, and said one of said pressure platens being resiliently secured to said cutting die.

10. The apparatus, as set forth in claim 9, which includes snap springs cooperating with said film guide platens, immovable, but adjustable abutment means defining the respective end portions of said film guide platens, and said snap springs urge said film guide platens toward said abutment means.

11. The apparatus, as set forth in claim 5, which includes a container receiving adhesive material, and means for applying said adhesive material to at least one of said two film ends.

12. The apparatus, as set forth in claim 11, which includes means for dosing said adhesive material to be applied to at least one of said film ends.

13. The apparatus, as set forth in claim 12, which includes a mouth piece, and said dosing means comprises a channel defined between said container and said mouth piece, and a valve member disposed at each end of said channel.

14. The apparatus, as set forth in claim 13, which includes control means for said mouth piece for mounting the latter on said film for applying said adhesive material.

15. The apparatus, as set forth in claim 14, which includes means for pressing said mouth piece onto said film ends with relatively great pressure and retaining said film ends in splicing position during the setting of said adhesive material.

16. The apparatus, as set forth in claim 15, wherein said mouth piece is an integral part of said container, and said control means includes means for lifting and lowering, respectively, said container with said mouth piece.

17. The apparatus, as set forth in claim 16, wherein said control means for said mouth piece and for said dosing means comprises cam means secured to a container shaft, and a common drive for said cam means.

18. The apparatus, as set forth in claim 17, which includes a further cam means, in addition to said cam means for said mouth piece and said dosing means, for operation of said cutting means, and a common drive for said cam means and said further cam means.

19. The apparatus, as set forth in claim 18, which includes a slide receiving said container for said adhesive material and said cutting means, a ground body, and said slide being displaceable in longitudinal direction of said film relative to said ground body.

20. The apparatus, as set forth in claim 19, which includes an additional cam member causing upon rotation the displacement of said slide, and joint drive means for said additional cam member, said further cam means and said cam means.

21. The apparatus, as set forth in claim 20, which includes holding devices for said film ends, means for relative displacement of said holding devices by said displacement of said slide, for pressing together said film ends at their butt ends.

22. The apparatus, as set forth in claim 21, which includes a shaft rotatably mounted in said slide, said further cam means and said cam means being secured to said shaft, said shaft including a partly screw-line shaped and partly plane-shaped groove, and a bolt secured to said ground body and received in said groove in order to perform a longitudinal movement of said slide during the rotation of said shaft.

23. The apparatus as set forth in claim 1, further comprising adjustable control means displaceable in a longitudinal direction retaining said guide platens in the cutting position.

24. The apparatus, as set forth in claim 23, which includes a lever, two parallel pairs of film guides disposed symmetrically relative to said lever, one of said pressure platen constitutes a first movable pressure die swingably mounted about an axis parallel to said film guides, a spring rotating said lever in operative position,
a common cutting die for both film ends having a cutting edge other than straight disposed within the range of a first of said pairs of said coaxial film guides,
said movable pressure die being disposed within the range of a second of said pairs of said coaxial film guides,
said cutting die and said movable pressure die being secured to said lever, and
the other of said presure platens constitutes a second immovable pressure die against which said first movable die is pressed in the operative position of said lever.

25. The apparatus, as set forth in claim 23, wherein said control means comprise faces displaceable in the longitudinal direction retaining said guide platens in the cutting position.

26. The apparatus, as set forth in claim 25, wherein said faces are resilient.

27. The apparatus, as set forth in claim 26, which includes a slide carrying resilient and curved runners,
said runners include said faces,
said lower pressure platen is secured to said slide,
a spring member urging said longitudinally displaceable guide platens towards said runners, and
a manually settable lever displacing said guide platens.

References Cited

UNITED STATES PATENTS

| | | | |
|---|---|---|---|
| 962,381 | 6/1910 | Nickerson et al. | 156—507 |
| 1,324,686 | 12/1919 | Metzger | 156—508 |
| 1,672,542 | 6/1928 | Rohrdanz | 156—508 |
| 1,851,800 | 3/1932 | Bogopolsky | 156—508 |
| 2,327,856 | 8/1943 | Bolsey | 156—508 |
| 2,475,351 | 7/1949 | Castay | 156—507 X |
| 2,516,602 | 7/1950 | Snyder | 156—507 X |
| 3,126,308 | 3/1964 | Brockerman et al. | 156—380 |
| 3,169,896 | 2/1965 | Dresser | 156—507 |
| 3,282,759 | 11/1966 | Nemeth | 156—157 |

ROBERT F. STAHL, Primary Examiner